(12) United States Patent
Furlong

(10) Patent No.: US 6,408,069 B1
(45) Date of Patent: Jun. 18, 2002

(54) COMPATIBILITY CIRCUIT FOR TELEPHONE HEADSET

(75) Inventor: Jeffrey A. Furlong, Rogers, MN (US)

(73) Assignee: Unicon Incorporated, Minneapolis, MN (US)

( * ) Notice: Subject to any disclaimer, the term of this patent is extended or adjusted under 35 U.S.C. 154(b) by 0 days.

(21) Appl. No.: 09/182,335

(22) Filed: Oct. 29, 1998

(51) Int. Cl.[7] ................................................ H04M 1/00
(52) U.S. Cl. ........................................ 379/394; 379/398
(58) Field of Search ................................ 379/394, 398; 381/111, 112, 113, 114, 115, 122

(56) References Cited

U.S. PATENT DOCUMENTS

| 4,536,888 A | 8/1985 | Wilson |
| 4,782,524 A | 11/1988 | McQuinn et al. |

*Primary Examiner*—Forester W. Isen
*Assistant Examiner*—Jefferey Harold
(74) *Attorney, Agent, or Firm*—Paul L. Sjoquist

(57) ABSTRACT

A selectable impedance matching circuit for matching the impedance of a telephone handset adapted for either a carbon microphone input or an electronic microphone input to the impedance of a headset microphone. The selectable impedance matching circuit includes a switch for connecting the headset microphone to the handset microphone input via a full wave bridge circuit, or connecting the headset microphone to the handset microphone input via an isolation transformer and resistor load.

10 Claims, 2 Drawing Sheets

COMPATIBILITY CIRCUIT FOR TELEPHONE HEADSET

BACKGROUND OF THE INVENTION

The present invention relates to a circuit for adapting a headset comprising an ear piece and a microphone to a telephone handset. In particular, the invention relates to an electrical interface circuit to efficiently couple a headset microphone signal to a telephone signal transmitting circuit.

A considerable market has developed for adaptations and attachments to the commercially-available telephone handset. Among theses adaptations are telephone headsets which may be clamped to a user's head to permit hands-free operation of the telephone. Such headsets incorporate an ear audio transducer which is held by the apparatus next to the user's ear, and a microphone typically mounted to the end of a boom which extends forwardly from the ear piece to a position proximate to the user's mouth. The ear audio transducer and the microphone are connected via wires to the telephone handset jack, either in substitution for or supplementary to the normal handset of the telephone.

A problem which is encountered whenever a new headset design is adapted for connection to a so-called "normal" telephone handset, is that a large number and variety of commercially available handsets have been constructed with carbon microphones, condenser microphones, magnetic microphones, etc., all of which present different impedances to the telephone handset. Therefore, the handset transmission circuits have been designed in conjunction with the microphone type with which it is used, to provide the optimal impedance match for signal transmission. The impedance of different types of microphone varies considerably; for example, a carbon microphone has an output impedance of 150–400 ohms, a condenser microphone has an output impedance of about 1,500 ohms, and a magnetic microphone has an impedance somewhere in between that of a carbon and condenser microphone. Furthermore, a carbon microphone input circuit requires connection to the telephone handset voltage power supply and an electronic microphone is isolated from the telephone handset voltage supply. Therefore, if a headset adapter is to be designed for a particular type of handset, it becomes necessary to also select a microphone headset circuit to match the telephone handset input impedance, thereby requiring different headset designs to match different telephone handset circuits. It would be an improvement in the art if a single microphone circuit could be adapted to match a plurality of telephone handsets.

A further advantage which is sought in the design of interface circuits of the general type disclosed herein is to provide a low voltage, low current circuit capable of operation on the power provided by one or two "AA" size batteries. Such batteries provide 3.0 volts of power at full charge, and a slightly lower voltage level as the energy charge in the battery dissipates. It is advantageous to design an interface circuit capable of operating with signals within the 0–3 volt range, or slightly lower if battery discharge characteristics are taken into account. The prior art interface circuits usually operate from a voltage converter plugged into a wall outlet, which of course greatly increases the size and cost of such interface circuits.

It is a principal object of the present invention to provide a circuit which enables either of several microphone designs for a handset to efficiently couple to a telephone headset.

It is another object of the invention to provide a circuit capable of low power operation, and within voltage signal levels provided by batteries.

Other and further objects and advantages of the invention will become apparent from the following specification, and with reference to the drawings and the claims presented herein, which describe a preferred embodiment of the invention.

SUMMARY OF THE INVENTION

A circuit for matching the impedance of either of several types of telephone handset microphone input impedances to the impedance of a telephone headset. The circuit has a switchable input to connect either of two impedance matching circuits to a handset input. The first impedance match circuit includes an isolation transformer coupling, and the second impedance circuit includes a bridge circuit; the circuits operate at a very low voltage and current level, and are operable from low voltage batteries.

DESCRIPTION OF THE PREFERRED EMBODIMENT

Figure 1:
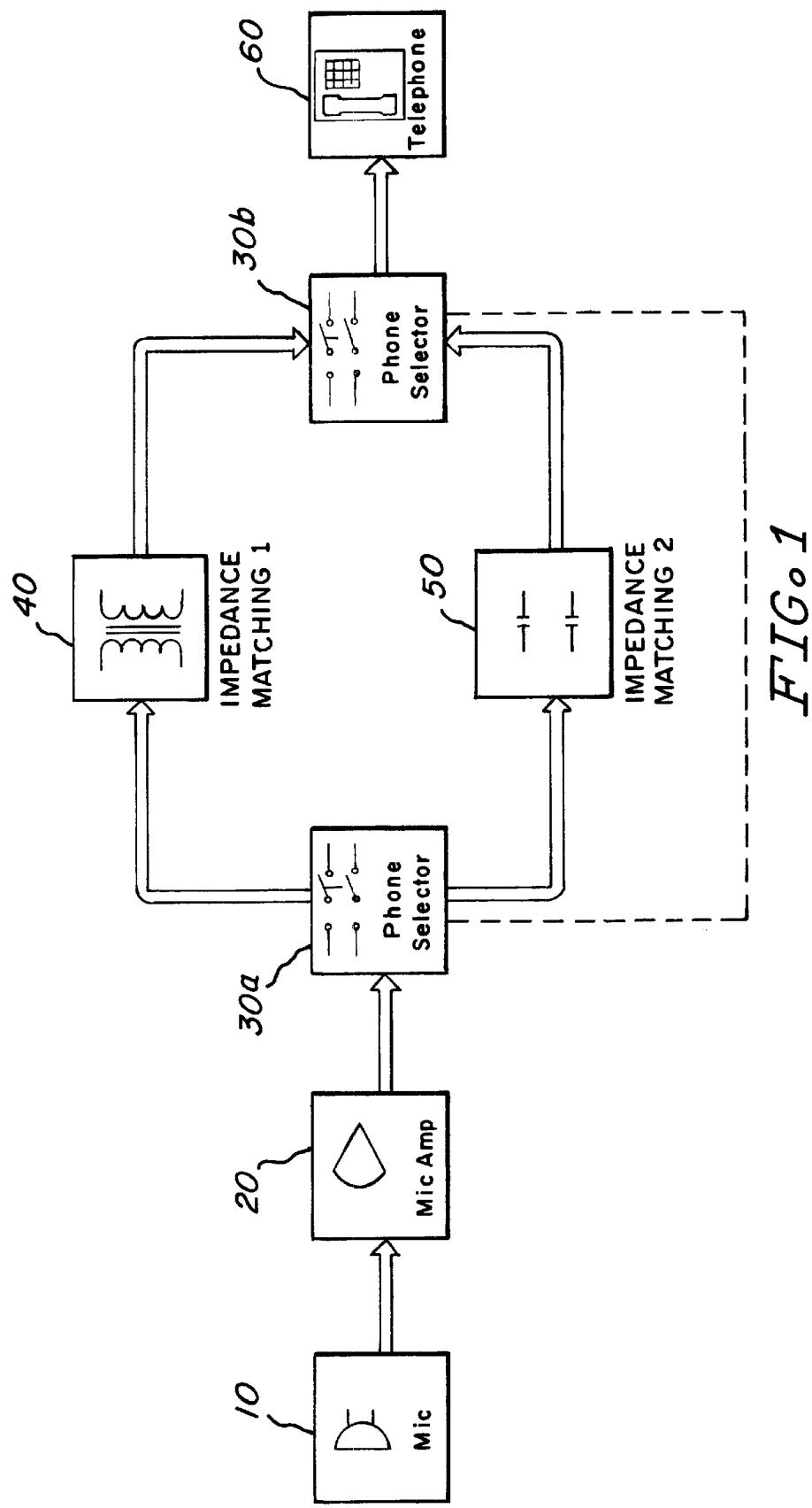
FIG. 1 shows a block diagram of the invention.

Referring first to FIG. 1, the invention is shown in block diagram form. A headset microphone 10 is connected to a microphone amplifier 20 in a conventional manner. The microphone amplifier 20 may be a commercially-available operational amplifier; the particulars of the amplifier 20 do not form a part of the present invention. The operational amplifier is selected because it typically provides good noise rejection and has high input and output impedance. The output signal of the microphone is typically a voice-frequency signal having a magnitude of 100 millivolts peak-to-peak (mvp-p), and the operational amplifier output signal is typically not greater than 250 mv in magnitude. The output of amplifier 20 is connected to a phone selector switch 30a, which can be switched manually to divert the amplifier 20 signal to either an "impedance matching 1" circuit 40, or to an "impedance matching 2" circuit 50. The outputs of each of the circuits 40 and 50 are connected to a phone selector switch 30b; switch 30b connects either of the circuits 40 or 50 to a telephone handset 60. Switches 30a and 30b are ganged together so they can both be switched together by a single manual operation. The telephone handset 60 input circuits can be either low impedance circuits usable with carbon microphones, or high impedance circuits usable with electronic microphones. The term "electronic microphone" is intended to include both magnetic microphones and condenser microphones, for they are substantially similar in terms of their input impedance requirements.

Figure 2:
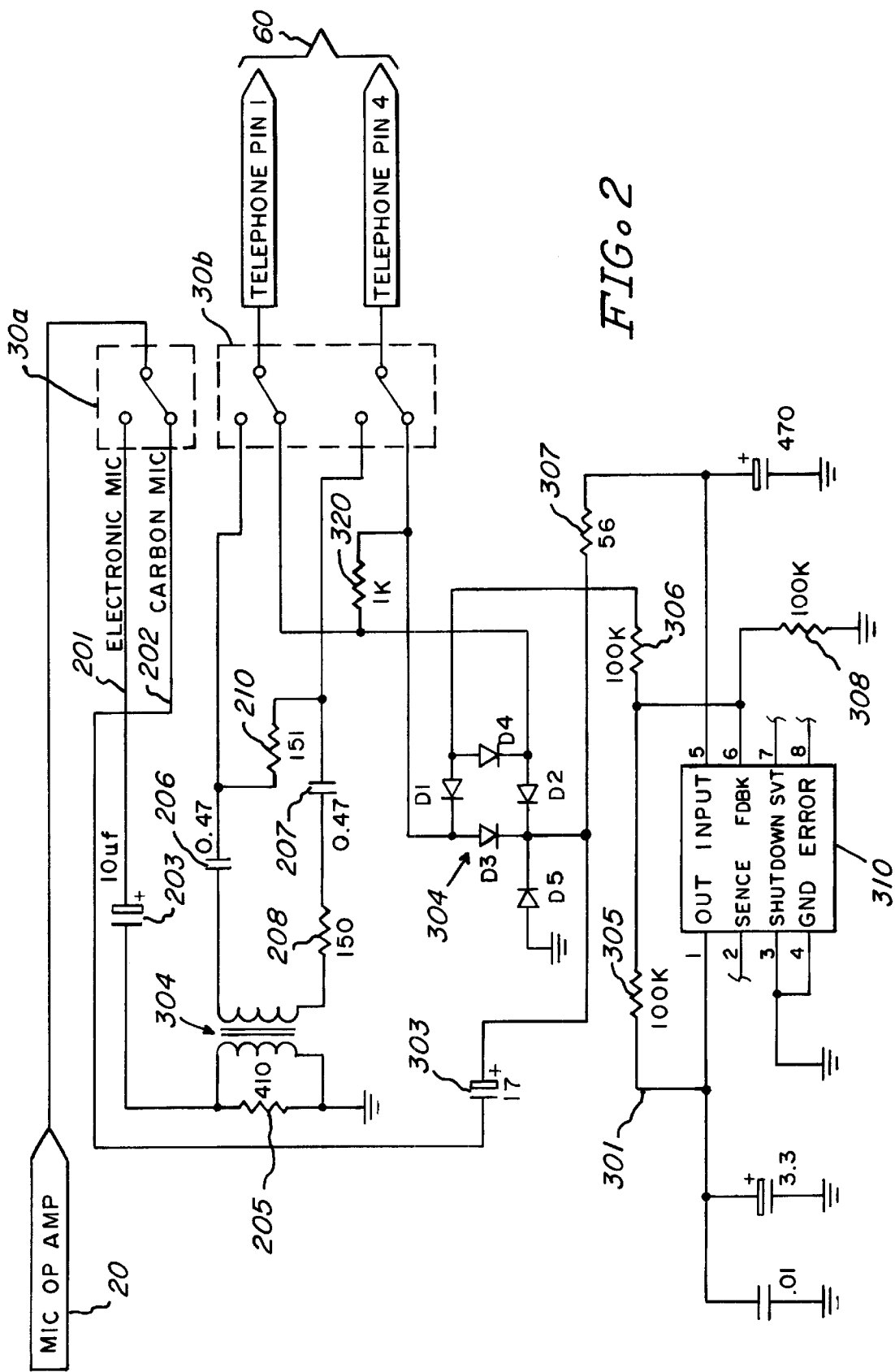
FIG. 2 shows a schematic diagram of the invention.

FIG. 2 shows a schematic diagram of the circuits of the present invention. The values of the passive components such as resistors and capacitors are shown next to each component; i.e., resistor values are in ohms or kilohms (K), and capacitor values are in microfarads. The voltage regulator circuit 310 is a commercially available microchip as identified herein.

Switch 30*a* has a switch contact connected to the output of microphone operational amplifier 20 which is switchable to either line 201 or 202. Line 201 is selected if the microphone being used is an electronic microphone; line 202 is selected if the microphone being used is a carbon microphone. The signal on line 201 is a low voltage alternating current signal which is coupled via an electrolytic capacitor 203 to an isolation transformer 204 primary winding and resistor 205, where an alternating current signal is developed across resistor 205 and the transformer primary winding. The electrolytic capacitor 203 presents a high impedance input to match the high impedance output of the operational amplifier 20. An output signal from transformer 204 is coupled, via capacitors 206 and 207, and resistor 208, to an output load resistor 210, and switch 30*b*. Switch 30*b* is ganged to switch with switch 30*a*, and therefore the output signal across load resistor 210 is connected to line contacts 1 and 4 within a telephone handset 60. With the switch 30*a*, 30*b* in the position to connect the signals on line 201 to the line contacts 1 and 4 of handset 60, it is presumed that handset 60 has been designed for use with an electronic microphone, for the impedance of the circuit network comprising transformer 204 secondary winding, resistance 208, capacitors 206 and 207, and resistance 210, is approximately 1000–1500 ohms, which is sufficient to match the impedance of an electronic microphone input circuit in handset 60.

The signal on line 202 is coupled via an electrolytic capacitor 303 to one corner of a bridge circuit 304, at the common connection of diodes D2 and D3, and voltage-limiting diode D5. This common connection point is also connected via resistor 307 as an input to a voltage regulator circuit 310, which typically may be a microcircuit chip of type LP2951. Capacitor 303 presents a high impedance input to the operational amplifier 20 output, and therefore provides a good impedance match to the amplifier output. The output signal from voltage regulator circuit 310 provides power to the operational amplifier 20 and other circuits related to the invention (not shown), and is applied via line 301 and resistors 305 and 306 to another corner of the bridge circuit 304; namely, the common connection point of diodes D1 and D4. The voltage developed across the two remaining corners of bridge circuit 304, namely, the common connection of diodes D2 and D4, and the common connection of diodes D1 and D3, is coupled to switch 30*b*, which connects the voltage to telephone contacts 1 and 4, when the handset design is intended to receive signals from a carbon microphone. In this case, the telephone handset provides a nominal 6 volts d.c. across contact points 1 and 4, and this voltage is used as the unregulated voltage input to the voltage regulator 310. Since the voltage polarity (+/−) across contact points 1 and 4 can be in either direction, the bridge circuit 304 is necessary to assure that the polarity of the unregulated d.c. voltage applied to the input to the voltage regulator 310 is always positive. The diodes D1, D2, D3 and D4 are Schottky diodes having a relatively small forward voltage drop; a Zener diode D5 is also connected at the input of the bridge circuit 304, to limit the maximum voltage excursion permitted at the input terminal.

The microphone signal on line 202 passes electrolytic capacitor 303, and is an a.c. signal having a peak-to-peak magnitude of about 250 millivolts; Zener diode D5 limits the maximum voltage, to prevent adverse effects in the event of a voltage surge. The a.c. microphone signal is impressed across resistance 320 (and handset contact points 1 and 4). The impedance presented to the telephone handset input circuitry is the parallel combination of resistance 320 and bridge circuit 304, which is a low impedance value on the order of 150–400 ohms, as required by the handset input circuits.

In operation, the user selects the type of microphone design for the handset by selecting the switch position of switch 30*a*, 30*b*. This connects the correct impedance matching circuit described above to the telephone handset input line contacts 1 and 4. The headset microphone can then be used in conjunction with the selected handset type without further adjustment or circuit change.

The foregoing description of a preferred embodiment of the invention is intended to by illustrative and not limiting as to the scope of the invention. The full scope of the invention is to be appreciated upon consideration of the specification, drawings and claims as presented herein.

What is claimed is:

1. A selectable impedance matching circuit for connection between a headset microphone and a telephone handset microphone input circuit, comprising
   a) a first impedance matching circuit having a capacitor-coupled isolation transformer input and a load resistor matched to the impedance of a first handset microphone input circuit;
   b) a second impedance matching circuit having a capacitor-coupled input to a bridge circuit and an output load resistor matched to the impedance of a second microphone input circuit; and
   c) a switch having an input section for connecting said headset microphone respectively to either said first or second impedance matching circuit, and having an output section for connecting either of said first or second impedance matching circuit to said telephone handset microphone input circuit.

2. The apparatus of claim 1, wherein said first impedance matching circuit further comprises a first load resistor across said isolation transformer input, and a second load resistor across said isolation transformer output, and capacitors coupling said isolation transformer output to said second load resistor.

3. The apparatus of claim 1, wherein said second impedance matching circuit further comprises a voltage limiting diode connected across its input.

4. The apparatus of claim 3, further comprising a voltage regulating circuit connected to said bridge circuit.

5. The apparatus of claim 4, wherein said bridge circuit further comprises a full wave rectifier bridge circuit utilizing Schottky diodes.

6. A circuit for enabling the connection of a telephone headset microphone to any of a plurality of telephone handset devices having respective different input impedances, comprising:
   a) a first circuit having an isolation transformer input, said isolation transformer having a secondary winding connected to an output load resistor of predetermined value, thereby forming an output circuit having an impedance to match one of said different input impedances;

b) a second circuit having an input connected to a full wave bridge circuit, said bridge circuit having an output connected to a resistor load of predetermined value, thereby forming an output circuit having an impedance to match another of said different input impedances;

c) a first switch having a switchable terminal connected to receive a signal from said headset microphone, and having a pair of switch contacts, each respectively connected to one of said first circuit input and said second circuit input;

d) a second switch having a switchable terminal connected to one of said plurality of handset devices, and having a pair of switch contacts, each respectively connected to one of said first circuit output circuit and said second circuit output circuit; and e) means for switching said first switch and said second switch together simultaneously from one switch contact to the other switch contact.

7. The apparatus of claim 6, further comprising an operational amplifier having an input connected to said headset microphone, and having an amplifier output terminal.

8. The apparatus of claim 7, further comprising a pair of capacitors, each capacitor respectively connected between said operational amplifier output terminal and one of said first circuit input and said second circuit input.

9. The apparatus of claim 8, wherein each of said pair of capacitors further comprises an electrolytic capacitor, and wherein each of said capacitors has a high impedance at audio frequencies.

10. The apparatus of claim 6, wherein said first circuit output circuit further comprises a pair of capacitors respectively connected in series relationship to said transformer secondary winding, each capacitor respectively connected to a different end of a resistor of predetermined value wherein said resistor is thereby connected across said secondary winding.

* * * * *